Oct. 12, 1948. J. D. LYALL 2,450,901
METHOD OF TREATING LIQUID SLURRIES TO SEPARATE
FIBERS FROM HEAVIER PARTICLES
Filed April 30, 1943

Inventor
John D. Lyall
By
Walter F. Kaufman
Attorney

Patented Oct. 12, 1948

2,450,901

UNITED STATES PATENT OFFICE 2,450,901

METHOD OF TREATING LIQUID SLURRIES TO SEPARATE FIBERS FROM HEAVIER PARTICLES

John D. Lyall, Lancaster Township, Lancaster County, Pa., assignor to Armstrong Cork Company, Lancaster, Pa., a corporation of Pennsylvania Application April 30, 1943, Serial No. 485,209

6 Claims. (Cl. 209—159)

This invention relates to a method of treating liquid slurries and, more particularly, to an arrangement whereby the solids contained in a liquid slurry and which would normally settle out may be maintained in a substantially uniform state of suspension in the liquid until such time as they are discharged into a mold for formation. The invention finds particular usefulness in the manufacture of mineral wool insulating blocks and the like where a water slurry of mineral wool fibers, paper pulp fibers, and asphalt emulsion is charged into a mold from a main source of slurry supply. One of the problems incident to the manufacture of such products is the tendency for the heavy mineral wool fibers to settle out into the bottom of the bulk supply tank resulting in the discharge of a nonuniform slurry to the molds, the consistency gradually increasing in solids content as the supply in the bulk tank recedes.

There is also a tendency for the fibers to be matted during mixing with the binder and these should be opened up into more or less discreet fiber form before molding in order to obtain the maximum insulation efficiency. Where mineral wool is used and proper precleaning has not been effected, the removal of shot, that is, the undrawn or unblown pellets of the material from which the mineral wool is formed, should be effected. These problems may not be present with certain types of slurries. With my method and apparatus, the fibers may be opened up and shot may be removed with facility and where these are problems, they are eliminated by the practice of my invention.

It is an object of my invention to provide for maintaining a uniform distribution of the solids in a slurry, particularly in a bulk slurry supply.

Another object of my invention is the removal of undesirable heavy bodies from a liquid slurry, such as the shot in mineral wool.

Another object of my invention is to provide a system by which any large clumps or nodules of fiber or other agglomeration of solids may be separated in the slurry to insure a substantially uniform consistency throughout.

Figure 1:
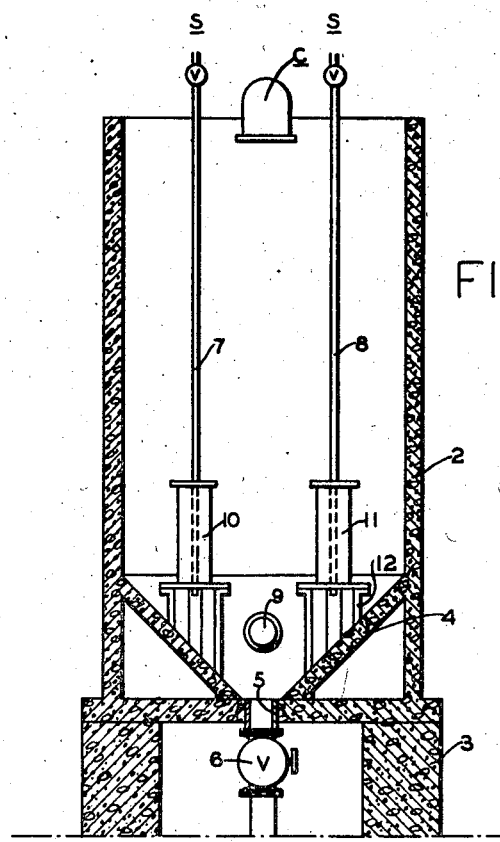
Figure 3:
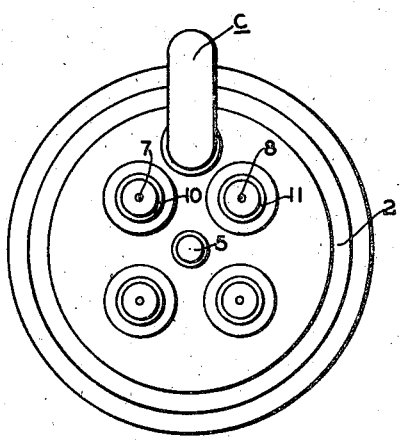
Figure 2:
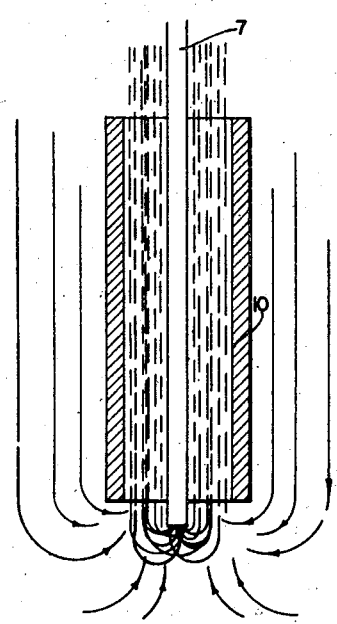

Other objects will become apparent from the description of the arrangement which follows, the description being made with reference to the attached drawing in which Figure 1 is a sectional view of a bulk supply tank with the apparatus of my invention embodied therein;

Figure 2 is a diagrammatic view generally indicating the flow of the fibers and the liquid of the slurry accomplished by means of my invention; and Figure 3 is a top plan view of the arrangement shown in Figure 1 illustrating the positions assumed by the various parts within the bulk supply tank.

According to my invention, a flow or circulation of the slurry is created or induced in the bulk supply by reducing the density of a limited portion or portions of the slurry and directing this circulation at a rate sufficient to effect the desired results in a reasonable length of time. The rate must be controlled where the solids in the slurry are friable, like mineral wool fibers, for if too violent working of the fibers is effected, there is a tendency for them to be broken, resulting in a short, undesirable fiber structure. The rate of movement or circulation must be fast enough, however, to maintain the fibers in suspension in the liquid against an inherent tendency to settle out. When shot removal is accomplished, the rate must be so adjusted that the fibers are held in suspension but the more dense particles of shot fall to the bottom where they may be conveniently removed. In other words, a gravity separation is effected directly in the slurry supply tank.

In the attached drawing, one embodiment of my invention is illustrated in connection with the treatment of a mineral wool, paper pulp, asphalt, and water slurry. In this arrangement, one or more conduits for the supply of gas, preferably air, to the liquid slurry are disposed in the bulk supply tank at a point preferably substantially below the normal level of the liquid in the tank. best results are obtained when these conduits are spaced adjacent the bottom of the tank, close to the discharge opening. These conduits are effective for supplying large volumes of air to the slurry. The air tubes alone do not perform successfully, however, because the movement is generally lateral and no definite path or area of circulation is created. According to my invention, each air conduit is surrounded by a confiner which is effective for confining and directing the movement of the slurry which is reduced in density by the air introduced into the slurry in the vicinity of the confiner. Thus, there is established or induced a definite flow or circulation within the bulk supply; the mass or column of lower density tending to rise and the heavier and denser portions of the slurry moving downwardly to replace the upwardly moving mass. The density of the slurry is reduced only within limited areas generally defined by the confiners. As a result, a very marked movement of the slurry is effected. Some turbulence is encountered in the confiners and this aids in breaking up the clumps which may be present and separating the fibers for proper distribution and removal of shot which may be held within the entangled mass.

Referring to Figure 1, there is shown a bulk supply tank 2 which in the embodiment illustrated is formed of reinforced concrete and is supported upon a base 3. The bottom of the tank 2 is generally conical as indicated at 4 and opens into a cleanout tube 5 controlled by a valve 6. An inlet conduit C supplies slurry to the tank 2. This may be arranged to continuously furnish slurry to the tank or it may be operated on a batch system. Disposed within the tank 2 are air inlet conduits 7 and 8, each of which is provided with a control valve and is connected to a suitable source of air supply S. These conduits extend to a point adjacent the discharge opening 9 from which the suspension of slurry is delivered to the molds for formation.

In a tank about 10 feet in diameter and about 18 feet high, I have found that four air inlet conduits ¾ inch in diameter supplying air at about 10 pounds pressure are effective for obtaining a very satisfactory suspension of mineral wool, paper pulp, and asphalt in water having about a 3% to 6% solids content. Surrounding the lower end of each of the air inlet tubes 7 and 8 are confiners 10 and 11 which are circular in cross section in the embodiment shown, about 12 inches in diameter, and about 3 feet long. The confiners are mounted upon supports 12 which are embedded in the concrete of the conical lower portion 4 of the tank 2. The size and shape of the confiners are not critical but they should be proportioned to take into account the type of material being operated upon, the size of the tank, and the quantity of solids in the slurry being operated upon. With certain types of slurries, a single air conduit and confiner may be provided in the center of the tank and this will be effective for obtaining the desired results. The length of the confiners determines to some degree the extent of the circulation along the vertical axis of the tank. When confiners of small diameter are used, circulation of higher velocity may be obtained with the same volume of air for the circulation is dependent upon a reduction of density in the mass of slurry and a greater density reduction is accomplished in a smaller volume of slurry with the same volume of air. I have found that particularly good results are obtained if the conduits supplying air extend a slight distance below the confiners. A distance of about 2 inches has been determined to give particularly satisfactory results on initiating a circulation within the slurry.

Figure 2 indicates generally the action which occurs within the bulk supply tank when the air is fed through the air conduit 7. The air is under pressure and first moves downwardly and then upwardly through the confiner 10. Since the slurry within the confiner 10 includes not only the solids and the liquid but also the air, the density of the column within the confiner and thereabove is reduced and moves upwardly. As this portion moves upwardly, additional slurry is drawn into the confiner as indicated generally by the arrows in Figure 2. This induces a flow of considerable magnitude within the tank. With four confiners as shown in Figure 3, there will be four distinct areas of motion or circulation within the tank due to the decrease in the density of the column of slurry generally defined by the diameter of each confiner. The admission of air is controlled by the valves in the conduits 7 and 8 so as to maintain the fibers in suspension but insufficient air is admitted to effect a rate of circulation sufficient to carry the more dense and heavier shot particles. There is a change in velocity from the downward vertical path of circulation to the horizontal path entering into the confiners and this is adjusted so that the shot which are heavier than the fiber merely continue downwardly while the fibers move horizontally into the confiners. The shot settles into the bottom of the tank below the discharge opening 9. There is some turbulence within the confiners and thereabove and this effects a general opening up of any clumps or agglomerations of fibers or other solids which may be present. As the operation continues, the entire mass of slurry is acted upon and a uniform suspension is obtained which may be maintained in that condition indefinitely by continuing the circulation of the slurry. The system is preferably operated on a continuous basis and a fresh supply is furnished through inlet C to replace material discharged through the opening 9 to the molds for formation. At the end of a day's operation, or more frequently if necessary, the inlet C may be closed and after the tank is emptied through the discharge opening 9, the valve 6 may be opened and the shot removed.

By this invention a uniform product may be obtained regardless of the particular level of liquid in the bulk supply tank. A substantially uniform dispersion of the solids is effected and maintained, any clumps of entangled fibers may be separated, and heavy shot or other undesirable foreign bodies may be removed.

While I have illustrated and described a preferred embodiment of my invention, it will be understood that the same may be otherwise embodied and practiced within the scope of the following claims.

I claim:

1. In a method of treating a liquid slurry containing fibers and undesirable heavier particles, a substantial portion of the solids of the slurry having a tendency to settle out, the steps of establishing a circulatory movement within the body of slurry in a generally upwardly and downwardly direction by injecting a stream of air downwardly into the slurry, confining the upwardly moving portion of the slurry separate from the downwardly moving portion in a zone spaced from and above the point of air injection and accelerating the upwardly moving portion of the slurry with respect to the downwardly moving portion in said zone, and adjusting the differential in rate between the upwardly and downwardly moving portions to draw the fibers out of their downward travel into the upwardly moving portion but insufficient to draw the undesirable heavy particles out of the downwardly moving portion.

2. In a method of treating a liquid slurry of mineral wool fibers containing undesirable heavier particles, a substantial portion of the solids of the slurry having a specific gravity greater than the liquid and tending to settle out, the steps of establishing a circulatory movement within the body of slurry in a generally upwardly and downwardly direction by injecting a stream of air downwardly into the slurry, with the upwardly moving slurry confined and separated from the downwardly moving portion in a zone spaced from and above the point of air injection, movement of said slurry being accelerated with respect to the downwardly moving slurry throughout at least a portion of its travel in said zone, and adjusting the rate of movement in an upwardly direction to draw the fibers of the slurry from their travel in a downwardly direction into the zone of the accelerated upwardly moving portion but insufficient to draw the undesirable heavier particles out of the downwardly moving portion of the slurry, the undesirable particles settling out.

3. In a method of treating a liquid slurry containing fibers and undesirable heavier particles, a substantial portion of the solids of the slurry having a tendency to settle out, the steps of establishing a circulatory movement within the body of slurry in a generally upwardly and downwardly direction by injecting a stream of air downwardly into the slurry, confining the upwardly moving portion of the slurry separate from the downwardly moving portion in a zone spaced from and above the point of air injection and accelerating the upwardly moving portion of the slurry with respect to the downwardly moving portion in said zone, effecting a turbulent motion within the confined portion, and adjusting the movement of the slurry to draw the desired fibers out of their downward travel and into the upwardly moving portion of the slurry where the fibers are separated by the turbulent movement, the accelerated movement of the upwardly directed portion of the slurry being insufficient to draw the undesirable heavier particles out of the downwardly moving portion whereby the heavier particles are settled out and the desirable fibers are maintained in suspension within the slurry.

4. In a method of treating a liquid slurry of mineral wool fibers containing undesirable heavy particles of shot or the like, the steps of establishing a circulatory movement within the body of slurry in a generally upwardly and downwardly direction by injecting air downwardly into the slurry and confining the upward movement of the air through the slurry in a zone spaced from and above the point of air injection and separated from the downwardly moving portion of the slurry to thereby accelerate the upwardly moving portion thereof with respect to the downwardly moving portion in said separated zone, and adjusting the rate of upward movement to a velocity sufficient to draw the fibers of the slurry from their travel in a downward direction into the accelerated upwardly moving stream but insufficient to draw the undesirable shot particles or the like into the upwardly moving stream whereby the shot particles or the like are settled out.

5. In a method of treating a liquid slurry containing fibers and undesirable heavier particles, a substantial portion of the solids of the slurry having a tendency to settle out, the steps of establishing a circulatory movement within the body of slurry in a generally upwardly and downwardly direction by injecting a stream of air downwardly into the slurry, confining the upwardly moving portion of the slurry separate from the downwardly moving portion in a zone spaced from and above the point of air injection to reduce the density of the slurry in a limited portion only of the body thereof to a degree where the desired fibers will be suspended in the liquid and thereby accelerating the upwardly moving portion of the slurry with respect to the downwardly moving portion in said zone, and adjusting the differential in rate between the upwardly and downwardly moving portions by altering the density of the slurry in said limited portion to a velocity where the fibers will be drawn out of their downward travel into the upwardly moving portion but the undesirable heavy particles will not be so drawn out, the density of the slurry in the limited portion of the body being adjusted to a point where desired fibers will be suspended and the undesirable particles will settle out.

6. In a method of treating a liquid slurry containing fibers and undesirable heavier particles, a substantial portion of the solids of the slurry having a tendency to settle out, the steps of establishing a circulatory movement within the body of slurry in a generally upwardly and downwardly direction by injecting a stream of air downwardly into the slurry, confining the upwardly moving portion of the slurry separate from the downwardly moving portion in a zone spaced from and above the point of air injection and accelerating the upwardly moving portion of the slurry with respect to the downwardly moving portion in said zone, adjusting the differential in rate between the upwardly and downwardly moving portions to draw the fibers out of their downward travel and into the upwardly moving portion but insufficient to draw the undesirable heavy particles out of the downwardly moving portion, permitting said heavier particles to settle out, and withdrawing the slurry of suspended fibers from a point above the level of the settled heavier particles.

JOHN D. LYALL.

REFERENCES CITED

The following references are of record in the file of this patent:

UNITED STATES PATENTS

| Number | Name | Date |
|---|---|---|
| 664,712 | Baldenebro | Dec. 25, 1900 |
| 751,645 | Hopkins | Feb. 9, 1904 |
| 830,552 | Zeigler | Sept. 11, 1906 |
| 1,180,089 | Thompson et al. | Apr. 18, 1916 |
| 1,253,653 | Welsch | Jan. 15, 1918 |
| 1,405,126 | Harris | Jan. 31, 1922 |
| 2,105,101 | Stelley | Jan. 11, 1938 |
| 2,174,540 | Wallace | Oct. 3, 1939 |
| 2,243,302 | Weinig | May 27, 1941 |
| 2,284,459 | Watkins | May 26, 1942 |
| 2,386,713 | Pharo | Oct. 9, 1945 |

FOREIGN PATENTS

| Number | Country | Date |
|---|---|---|
| 9,038 | Great Britain | Apr. 20, 1904 |
| 167,504 | Great Britain | July 27, 1922 |
| 352,931 | Great Britain | July 10, 1931 |